No. 772,283. PATENTED OCT. 11, 1904.
S. E. LLONA.
GEOMETRICAL INSTRUMENT.
APPLICATION FILED SEPT. 3, 1903.
NO MODEL. 2 SHEETS—SHEET 1.

WITNESSES:
INVENTOR
Scipion E. Llona
BY
ATTORNEYS.

No. 772,283. PATENTED OCT. 11, 1904.
S. E. LLONA.
GEOMETRICAL INSTRUMENT.
APPLICATION FILED SEPT. 3, 1903.
NO MODEL. 2 SHEETS—SHEET 2.

WITNESSES:

INVENTOR
Scipion E. Llona
BY
ATTORNEYS.

No. 772,283. Patented October 11, 1904.

UNITED STATES PATENT OFFICE.

SCIPION E. LLONA, OF LIMA, PERU.

GEOMETRICAL INSTRUMENT.

SPECIFICATION forming part of Letters Patent No. 772,283, dated October 11, 1904.

Application filed September 3, 1903. Serial No. 171,843. (No model.)

*To all whom it may concern:*

Be it known that I, SCIPION E. LLONA, a citizen of the Republic of Peru, and a resident of Lima, Peru, have invented a new and Improved Geometrical Instrument, of which the following is a full, clear, and exact description.

My invention relates to certain novel and useful improvements in geometrical instruments, and has particular application to a device for accurately dividing and subdividing angles and rectifying circles or parts of circles.

In carrying out my invention I have in view providing an instrument which shall be exceedingly simple in its construction and one which may be manufactured in large numbers at but comparatively small expense.

A further object is to provide an instrument which shall enable mathematicians, engineers, draftsmen, and those engaged in like professions to divide and subdivide angles into any number of parts with exactness and accuracy and also to rectify circles or parts of circles.

With these and other objects of a similar nature in view my invention consists in an instrument constructed and arranged as is described in this specification, delineated in the accompanying drawings, and set forth in the appended claims.

Reference is to be had to the accompanying drawings, forming a part of this specification, in which similar characters of reference indicate corresponding parts in all the figures.

Figure 1:
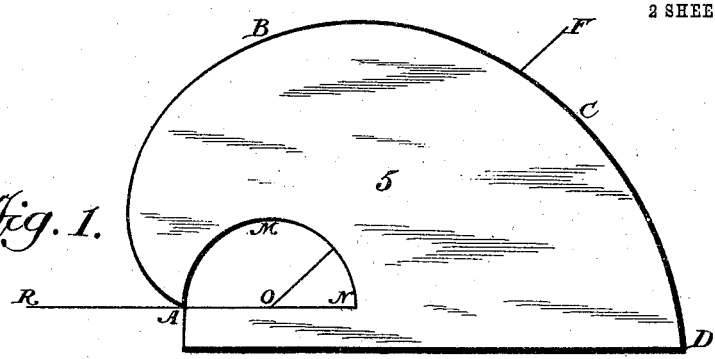

Figure 1 is a plan view of an instrument embodying my invention, and Figs. 2 to 6 are diagrammatic views explanatory and illustrative of the manner of employing my invention.

Before proceeding to describe the instrument *per se* I will briefly explain the theory or method on which it is constructed.

Figure 2:
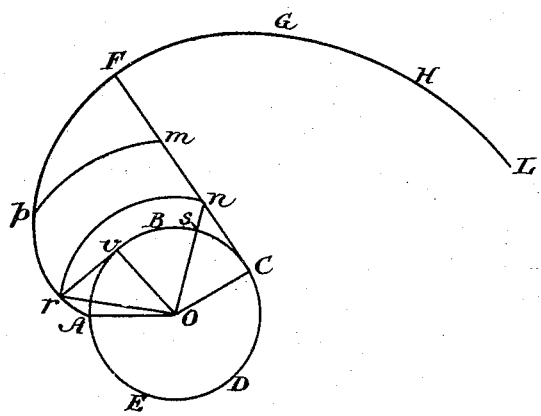
Figure 3:
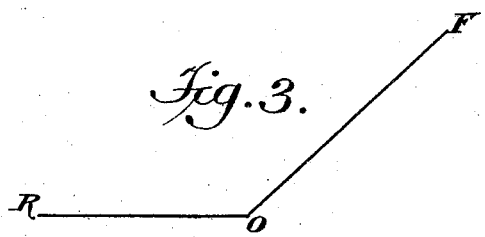

To obtain the proper shape and form of the instrument, I first take a cylinder whose base is a true circle and trace the circular outline of such base upon a suitable surface, such as a sheet of paper. This circle is shown in Fig. 2 of the drawings and is designated by the letters A B C D E. A fine thread or cord of the least possible longitudinal elasticity is wound around the cylinder, and to one end of the thread I secure the point of a pencil or marker, always keeping such thread tight, and the latter is developed or unwound, so that a perfect spiral curve A F G H L will be marked upon the paper. This paper may be used as the instrument; but it is more convenient to use it as a templet for forming an instrument of more durable material.

Now if from any of the points of the curve— F, for instance—a tangent F C is directed to the generating-circle A B C D E, the longitude of this tangent will be equal to the arc A B C of the circle, since the line F C is the equal of the thread which was wound on the arc A B C.

Dividing the straight line F C into three equal parts, for instance, the result will be the points $m$ and $n$. From O, the center of the generator-circle, and with a radius O $n$ the arc $n\ r$ is traced so as to cut the spiral curve at $r$, and the tangent $r\ v$ is then drawn. The points $r$, $v$, and $n$ are then united with the center O. The two rectangle triangles $r\ v$ O and $n\ C$ O thus formed are equal. O $r$ equals O $n$, because they are radii of the same circumference, and $v$ O equals C O for the same reason. Consequently the side $r\ v$ is equal to $n$ C, and as $n$ C equals one-third of F C then $r\ v$ equals one-third of F C; but because of a property peculiar to the spiral I find that the tangent $r\ v$ is equal to the arc A $v$, as said tangent $r\ v$ is the part of the thread which was wound over the arc A $v\ x$, and tangent F C is equal to the arc A B C. Then the arc A $v$ equals one-third of the arc A B C. Performing the same operation with the point $m$ from the point O, with a radius equal to the distance O $m$, the arc $m\ p$ is drawn, and from $p$, with a distance equal to C $m$, I trace an arc which will cut the generating-circle at $s$. It will thus be seen that the arc A $v\ s$ is equal to the straight line $m$ C, and as this is equal to two-thirds of C F, which in turn equals the arc A B C, the result will be arc A $v\ s$ equals two-thirds of arc A B C, and as, as has been seen, arc A $v$ equals one-third of arc A B C it results that arc $v\ s$ equals one-third of arc A B C, and arc $s$ C equals one-third of arc A B C. Therefore arc A B C is divided into three equal parts A v, v s, and s C.

I will now proceed to describe the construction of my improved angle-dividing instrument.

Figure 4:
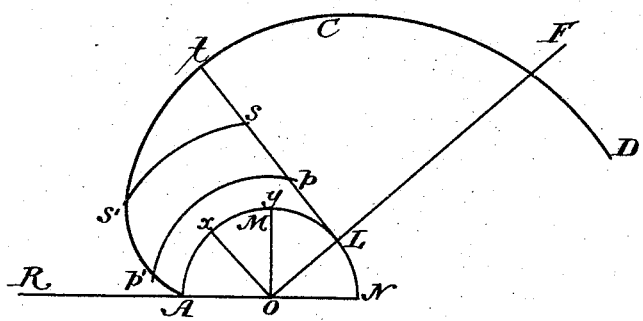
Figure 5:
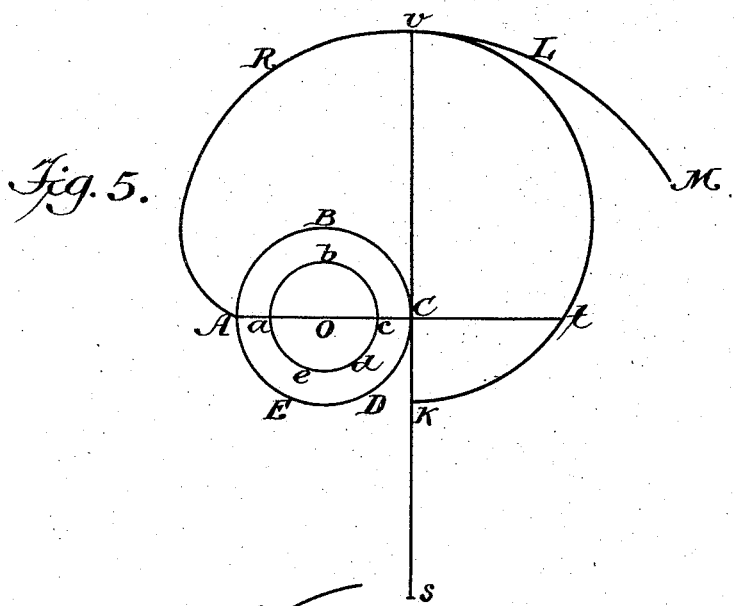

The body portion of the instrument, which is shown at 5 in Fig. 1, is formed of a plate of any suitable material—such as celluloid, wood, rubber, or metal—and is shaped as shown in said Fig. 1—that is to say, the edge A B C D follows or coincides with the line of curvature of the spiral A F G H L of Fig. 2. The curve A M N may, for identically the same purpose as recited above in connection with the generator-circle, be cut away to form a semicircular aperture in the body portion, and a mark or point O made on the diameter A N makes the center of such circle. It is not necessary to cut the body portion away when the instrument is made of transparent material. It will be readily apparent that this instrument permits the division of any angle into any number of geometrically-equal parts. For instance, if it be desired to divide the angle R O F (see Fig. 3) into three equal parts the instrument is placed with the straight marginal edge A N on the side R O of the given angle. The point O on the said marginal edge rests on the vertex O of the angle. In this position the marginal semicircumferential line A M N is followed with a fine pencil, and the spiral exterior edge A B C D of the instrument is also traced. It will therefore be seen that when the instrument is removed I have traced the generating-semicircle and the spiral as is shown in Fig. 4. From the point L to the point t the tangent L t is drawn, and this is divided into three equal parts L p, p s, and s t, while from the center O the arcs p' p and s' s are drawn, such arcs, as will be seen, extending from the spiral curve to the tangent L t. From p' as a center and with a radius equal to L p the point x is indicated on the circle, and from s', with a radius equal to L s, the point y is indicated on the circle. Uniting x with O and y with O, it will be found according to theory the angle A O x is equal to one-third of R O F, x O y equal to one-third of R O F, and y O L is equal to one-third of R O F—that is to say, that the given angle R O F is divided into three mathematically exact equal parts. The same method would be followed were it desired to divide the angle into four, five, or six equal parts, as it would only be necessary to divide the tangent into four, five, or six parts.

In addition to being employed for dividing angles into equal parts my invention may also be used to make proportional divisions. For instance, if it is desired to divide the angle R O F into two parts in such a manner that one of these parts will be to the other as two is to three it is sufficient to divide the tangent L t into two parts, which will be in that proportion of two to three, such division afterward being transferred or indicated on the arc A M L, as was previously done.

If it is desired to trace geometrically the square whose area shall be equal to the area of the generating-circle A B C D E, (see Fig. 5,) the spiral curve A R L M is formed with the instrument and the tangent C v is drawn, such tangent being equal to the arc A B C, which is the semicircumferential margin of the cutaway portion of the instrument. Now if the straight line v C is prolonged and if s C is equal to C v it will be found that s v is equal to the circumference A B C D E. On the line C s the portion C K is marked equal to A O, the radius of the generating-circle, and then with v K as a diameter the semicircle v K is traced and the line C t is formed by prolonging A C to the point t. According to well-known problems we find that v C is to C t as C t is to C K. Then C $t^2$ equals v, v C. C K; but v C equals one-half circumference A B C D E and C K equals radius. Therefore v C. C K equals the area of the circle A B C D E; result, C $t^2$ equals the area of the circle A B C D E—that is to say, that C t is the side of the square whose area will be equal to that of the generating-circle. Now if the circle whose area it is desired to square is not precisely A B C D E, but is, for instance, a b c d e, (see Fig. 5,) it will be an easy matter to find the side of its respective square, knowing that of the square of the generating-circle, because if x represents the side it is desired to find it will be seen that x is to C t as a O is to A O, and as the three last terms of this proportion are given the fourth may be easily found.

Figure 6:
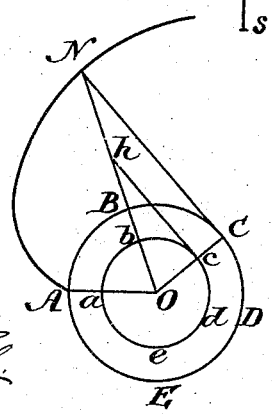

This instrument will also be found exceedingly useful for accomplishing the rectification of any arc of a circle different from the generating-circle traced by a rule. In Fig. 6, A B C D E represent the generating-circle and A N the spiral. Now a b c d e is a circle different from the generating-circle, and a b c is the arc which it is desired to rectify. To the accomplishment of this end the angle A O C is traced corresponding to the arc on the point C, and the tangent C N is drawn, which, as has been heretofore demonstrated, is the rectification of the arc A B C. The point N is then united with the point O, and on the point c is traced the tangent c h, which will be the rectification of the arc a b c. In reality C N and c h are parallel, because the angles N C O and h c O are right angles. Consequently in the triangle O N C we have the following proportion: N C is to h c as O C is to O c. On the other hand, the arcs A B C and a b c, which belong to the same angle, are to each other as the radius of their respective circles. Consequently the arc A B C is to the arc a b c as O C is to O c; but arc A B C equals N C. Then the two mentioned proportions have three equal terms, the result being that the fourth term is also equal. Consequently arc $a\,b\,c$ equals $h\,c$.

Thus it is seen that my rule permits the rectification practically and with geometrical exactness of no matter what arc of any circle, and, vice versa, it allows us if we have any given magnitude on any straight line to transport it on a circumference with a determined radius. As a consequence of this it is possible also to transport the value of the totality or of part of a circumference of radius $m$ or any other circumference with a greater or smaller radius. Finally, all problems relative to the rectification of circumferences are resolved in an easy, practical, and exact manner employing that instrument.

The rules may be easily and readily made, and the instrument embracing, as it does, the essential features of simplicity and inexpensiveness will commend itself to persons who study or practice linear drawing.

Having thus described my invention, I claim as new and desire to secure by Letters Patent—

1. An instrument for dividing angles, comprising a body portion having an aperture therein, said aperture having a straight edge, and said body portion having an edge curved in spiral form constituting an involute of the outline of said aperture, said spiral edge extending from the straight edge of the aperture.

2. An instrument for dividing angles comprising a plate having a semicircle, cut therefrom, the body portion having an edge substantially the contour of a spiral curve forming the involute of said semicircle, said spiral edge terminating at one extremity at the base edge of the semicircle.

3. An instrument for dividing angles, comprising a body portion having a semicircular aperture therein, and an edge having the contour of an involute of the semicircle, said edge extending outwardly from the intersection of the semicircle with its limiting diameter.

4. A geometrical instrument for dividing angles, having a closed semicircular aperture therein, and an outside edge in the form of an involute drawn from the curved edge of said aperture.

5. A geometrical instrument, having an aperture and comprising an evolute and its involute, said involute constituting the external edge of the instrument, and said evolute constituting an edge of an aperture in the instrument.

In testimony whereof I have signed my name to this specification in the presence of two subscribing witnesses.

SCIPION E. LLONA.

Witnesses:
A. SARCIA LIGOYER,
JOSÉ C. SIERRA.